: (12) United States Patent
Cormier et al.

(10) Patent No.: US 8,774,805 B2
(45) Date of Patent: Jul. 8, 2014

(54) SYSTEM AND METHOD FOR RADIO ACCESS TECHNOLOGY-SPECIFIC ROUTING FOR MULTI-MODE MOBILE DEVICES (75) Inventors: Jean-Philippe Cormier, Ottawa (CA); Trevor Plestid, Ottawa (CA); M. Khaledul Islam, Kanata (CA)

(73) Assignee: Blackberry Limited, Waterloo (CA)

( * ) Notice: Subject to any disclaimer, the term of this patent is extended or adjusted under 35 U.S.C. 154(b) by 1025 days.

(21) Appl. No.: 12/270,090

(22) Filed: Nov. 13, 2008

(65) Prior Publication Data

US 2010/0009676 A1 Jan. 14, 2010

Related U.S. Application Data (60) Provisional application No. 61/079,940, filed on Jul. 11, 2008.

(51) Int. Cl.
*H04W 4/00* (2009.01)
*H04W 40/00* (2009.01)
*H04W 72/00* (2009.01)
*H04L 12/28* (2006.01)

(52) U.S. Cl.
USPC ............. 455/435.2; 455/445; 455/452.2; 370/338; 370/351

(58) Field of Classification Search
USPC ............. 455/422.1, 428, 435.2, 435.3, 445, 455/524–525, 552.1, 553.1
See application file for complete search history.

(56) References Cited

U.S. PATENT DOCUMENTS

| 6,748,246 | B1 | 6/2004 | Khullar | |
|---|---|---|---|---|
| 6,771,964 | B1 | 8/2004 | Lahtinen et al. | |
| 6,782,429 | B1 | 8/2004 | Kisor | |
| 6,801,777 | B2 | 10/2004 | Rusch | |
| 6,961,583 | B2 | 11/2005 | Moles et al. | |
| 6,973,502 | B2 | 12/2005 | Patil | |
| 6,978,138 | B2 | 12/2005 | Japenga et al. | |
| 7,047,037 | B2 | 5/2006 | Ormson | |
| 7,522,558 | B2 * | 4/2009 | Ikeda | 370/331 |
| 2002/0059453 | A1 | 5/2002 | Eriksson et al. | |
| 2003/0054809 | A1 * | 3/2003 | Bridges et al. | 455/419 |
| 2003/0100308 | A1 | 5/2003 | Rusch | |
| 2004/0064591 | A1 * | 4/2004 | Noble | 709/250 |
| 2004/0131078 | A1 * | 7/2004 | Gupta et al. | 370/466 |
| 2004/0203893 | A1 * | 10/2004 | Kotzin | 455/456.1 |

(Continued)

FOREIGN PATENT DOCUMENTS

CA 2589961 5/2007
EP 1526682 A2 4/2005

(Continued)

OTHER PUBLICATIONS

U.S. Office Action dated Oct. 5, 2010 issued in respect of U.S. Appl. No. 12/032,145.

(Continued)

*Primary Examiner* — Dwayne Bost
*Assistant Examiner* — Nalini Mummalaneni (57) ABSTRACT Systems and methods for radio access technology specific routing for multi-mode mobile devices are provided. For each of a number of radio access technologies supported by a mobile device, the mobile device is configured to use respective routing information. This has the advantage of allowing radio access technology specific processing to be performed.

23 Claims, 8 Drawing Sheets

(56) References Cited

U.S. PATENT DOCUMENTS

| | | | |
|---|---|---|---|
| 2005/0117544 A1 | 6/2005 | Goris et al. | |
| 2005/0170853 A1 | 8/2005 | Verma et al. | |
| 2005/0215246 A1* | 9/2005 | Soderbacka et al. | 455/426.1 |
| 2006/0181517 A1 | 8/2006 | Zadesky | |
| 2007/0058628 A1 | 3/2007 | Palnati et al. | |
| 2007/0115899 A1 | 5/2007 | Ovadia et al. | |
| 2007/0211624 A1 | 9/2007 | Schmidt et al. | |
| 2007/0217354 A1* | 9/2007 | Buckley | 370/328 |
| 2007/0255797 A1* | 11/2007 | Dunn et al. | 709/217 |
| 2008/0102815 A1* | 5/2008 | Sengupta et al. | 455/424 |
| 2008/0182615 A1* | 7/2008 | Xue et al. | 455/552.1 |
| 2009/0005098 A1 | 1/2009 | McGowan et al. | |
| 2010/0062760 A1 | 3/2010 | Fuccellaro et al. | |
| 2010/0145702 A1 | 6/2010 | Karmarkar | |

FOREIGN PATENT DOCUMENTS

| | | |
|---|---|---|
| EP | 1926283 A1 | 5/2008 |
| FR | 2865599 | 7/2005 |
| GB | 2346507 A | 8/2000 |
| GB | 2436187 A | 9/2007 |
| WO | 0203733 A1 | 1/2002 |
| WO | 2004008793 A | 1/2004 |
| WO | WO 2004/040931 A3 | 5/2004 |
| WO | WO 2005/117463 A2 | 12/2005 |
| WO | WO 2006/098599 A1 | 9/2006 |
| WO | 2008011420 A | 1/2008 |
| WO | 2008011420 A1 | 1/2008 |

OTHER PUBLICATIONS

EP Examination Report for EP Application No. 08 151 541.3-2416.

Inoue, Masugi, et al.; Prototype of Context-Based Adaptive Communication System on Seamless Networking Platform; IEEE, 2004, pp. 1070-1074. http://ieeexplore.ieee.org/Xplore/login.jsp?url=/iel5/9435/29981/01373863.pdf?arnumber=1373863.

WirelessMoves, Thoughts on the evolution wireless networks and the mobile web 2.0. http://mobilesociety.typepad.com/mobile_life/2007/03/deep_inside_the.html.

Tianzhou, Chen, et al.; Unified Mobile Protocol Stack With Network Sub-Protocol Component Framework; Proceedings of the 23$^{rd}$ IASTED International Multi-Conference, Parallel and Distributed Computing and Networks, Feb. 15-17, 2005, Innsbruck, Austria, pp. 64-69. http://www.actapress.com/PaperInfo.aspx?PaperID=19175&reason=500.

Resource Management Techniques and Guidelines for Implementation, pp. 169-172. http://books.goggle.com/books?id=dZttisVpy0QC&pg=PA170&lpg=PA170&dq=cell+or+network+or+rat+and+(reselection%7Crank%7Corder)+-patent&source=web&ots=fzfDZ12mwh&sig=bKZghPIMP46sfEkS3YoD-PAahQQ#PPA169.M1.

Northstream, Operator Options Beyond 3G, Whitepaper, Feb. 2005, pp. 1-30. http://www.3gamericas.org/pdfs/northstream_operator_options_beyond3G_feb2005.pdf.

Andrea Acquaviva, et al., "Server Controlled Power Management for Wireless Portable Devices", Mobile and Media Systems Laboratory, HP Laboratories Palo Alto, HOL-2003-82, Apr. 17, 2003.

W. Qadeer, et al., "Heterogeneous Wireless Network Management", Stanford University, HP Labs.

Thomas Stockhammer, et al., On Practical Crosslayer Aspects in 3GPP Video Services, International Multimedia Conference, Augsburg, Bavaria, Germany, 2007, (http://portal.acm.org/citation.cfm?id=1290053).

European Examination Report for European Application No. 08 151 541.3-2416.

* cited by examiner

SYSTEM AND METHOD FOR RADIO ACCESS TECHNOLOGY-SPECIFIC ROUTING FOR MULTI-MODE MOBILE DEVICES

RELATED APPLICATION

This application claims the benefit of U.S. Provisional Application No. 61/079,940 filed Jul. 11, 2008 hereby incorporated by reference in its entirety.

FIELD OF THE APPLICATION

The application relates to multi-mode mobile devices.

BACKGROUND

Wireless mobile devices are increasingly deployed with multiple air interfaces. These multimode devices will have the capability of connecting to services through totally different radio access technologies, typically depending on the location of the user.

BRIEF DESCRIPTION OF THE DRAWINGS

Embodiments of the application will now be described with reference to the attached drawings in which.

DETAILED DESCRIPTION

According to one broad aspect, the application provides a mobile device comprising: a respective wireless access radio for each of a plurality of RATs (radio access technologies); a mobile device RAT-specific routing information routing information repository containing respective RAT-specific routing information for each of the plurality of RATs; a routing information selector configured to select the RAT-specific routing information for a given RAT of the plurality of RATs; the mobile device configured to operate using the selected RAT-specific routing information.

According to another broad aspect, the application provides a method in a multi-mode mobile device, the method comprising: storing respective RAT-specific routing information for each of a plurality of RATs; when operating using a given one of the plurality of RATs, operating using a respective wireless access radio for the given RAT and using the RAT-specific routing information for the given RAT.

According to another broad aspect, the application provides a routing information server comprising: a mobile device capability repository from which can be determined which of a plurality of RATs (Radio Access Technologies) are supported by each of a plurality of mobile devices; a RAT-specific routing information containing a respective routing information for each of a plurality of RATs; a RAT-specific routing information generator that determines which of a plurality of RATs are supported by a given mobile device from the mobile device capability repository, obtains the respective routing information from the RAT-specific routing information repository for each RAT supported by the device, and outputs a communication containing the RAT-specific routing information for the mobile device; and at least one network connection for receiving a request for RAT-specific routing information for a mobile device, and for outputting the RAT-specific routing information for the mobile device.

According to another broad aspect, the application provides an application server comprising: at least one application processor for implementing a service; a plurality of RAT-specific endpoints; the application server configured to use the at least one application processor and one of the plurality of RAT-specific endpoints to provide a service to a mobile device by sending data to and receiving data from the mobile device through the one of the plurality of RAT-specific endpoints; an endpoint switcher configured to automatically switch to using another one of the plurality of RAT-specific endpoints to provide the service to the mobile device upon receiving data from the mobile device through the other of the plurality of RAT-specific endpoints.

Other embodiments provide one or more computer readable media having computer executable instructions stored thereon for executing, or coordinating the execution of one or more of the methods summarized above, or detailed below.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
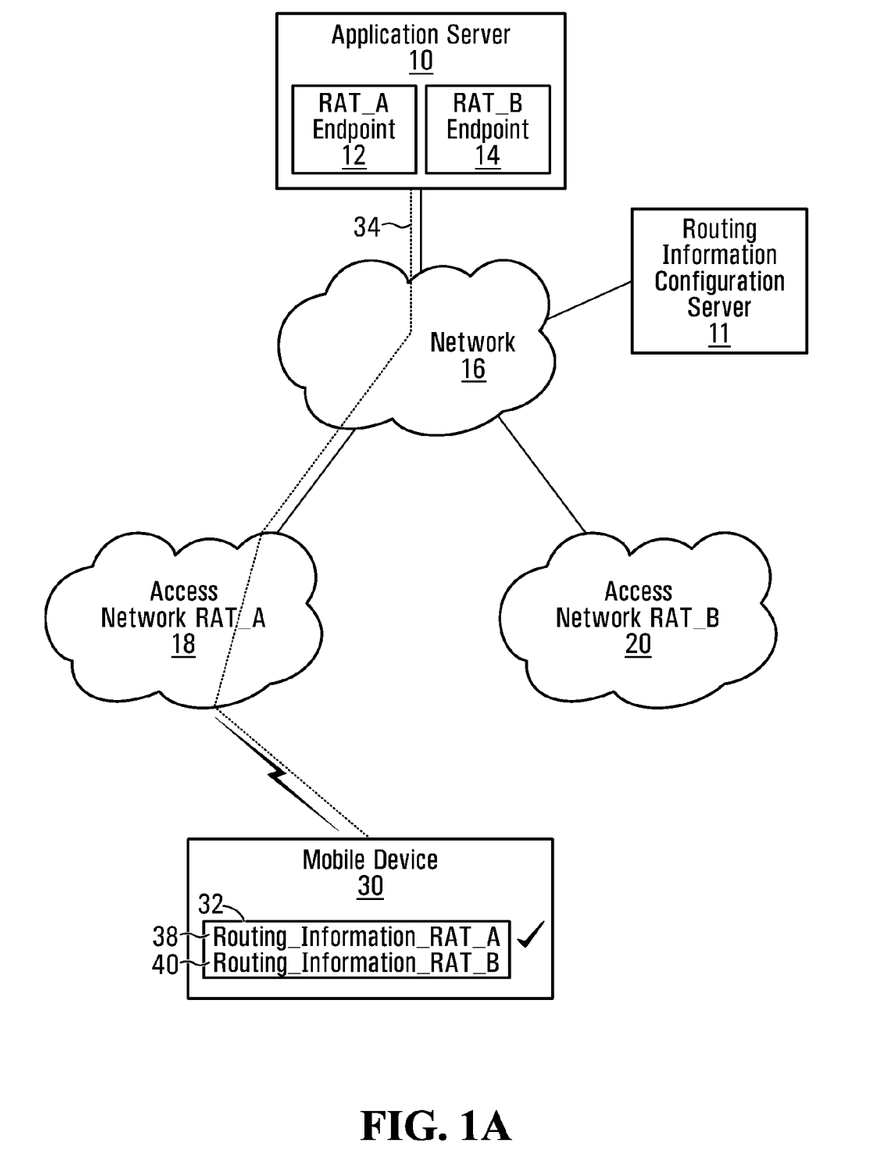
FIGS. 1A and 1B are block diagrams of a system in which radio access technology (RAT)-specific host routing is provided for multi-mode mobile devices.
Figure 1B:
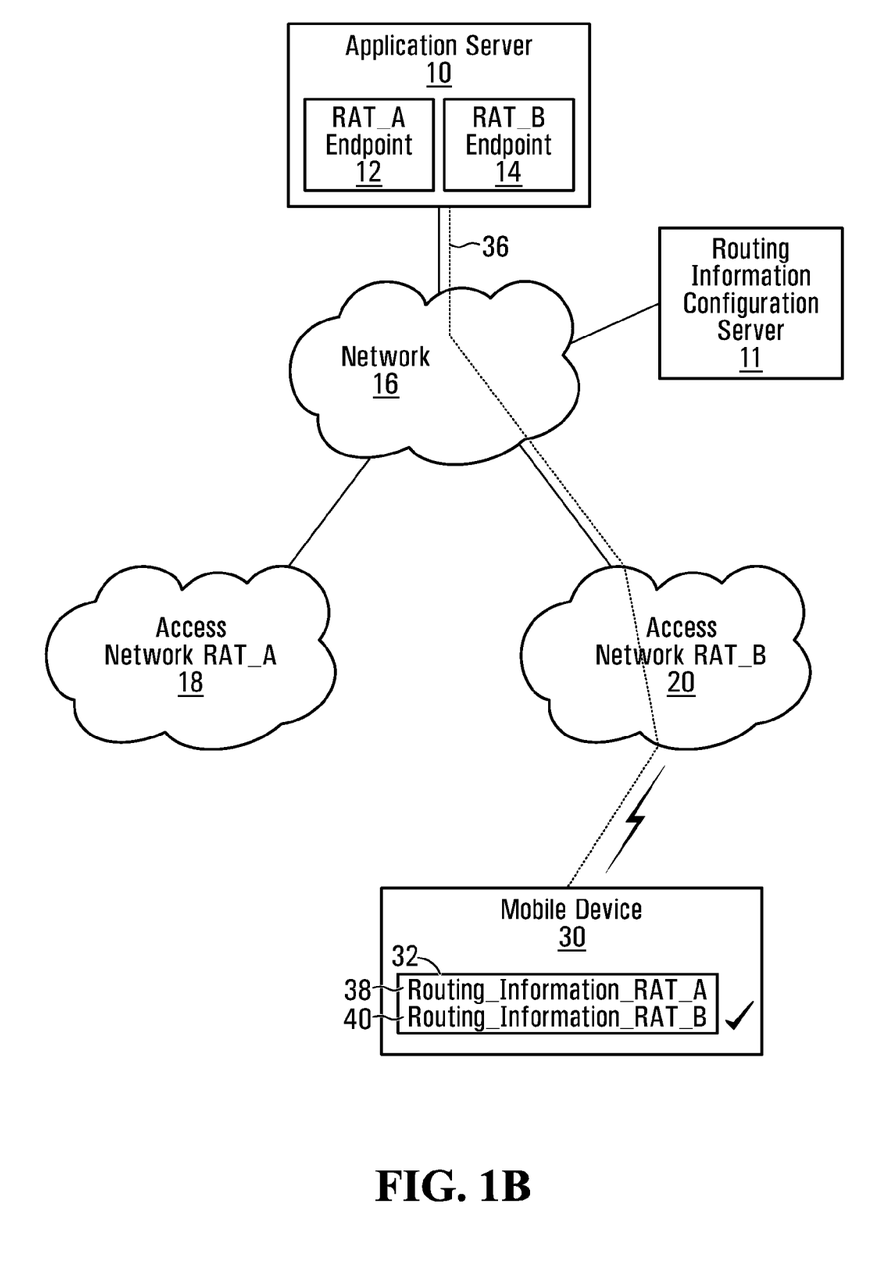

Referring now to FIGS. 1A and 1B, shown are block diagrams of a system in which radio access technology (RAT)-specific host routing is provided for multi-mode mobile devices. As will be detailed below, FIG. 1A depicts the system at a first instant in time, while FIG. 1B depicts the same system at a second instant in time.

Shown is an application server 10 equipped with a first endpoint 12 referred to as RAT_A endpoint, and equipped with a second endpoint 14 referred to as RAT_B endpoint. The RAT_A endpoint is configured to be the point of entry/exit for the transmission of data to mobile devices and the receipt of data from mobile devices from the application server 10 for mobile devices that are using a first radio access technology, RAT_A, as their radio access technology. The RAT_B endpoint is configured to be the point of entry/exit for the transmission of data to mobile devices and the receipt of data from mobile devices from the application server 10 for mobile devices that are using a second radio access technology, RAT_B, as their radio access technology. The application server 10 provides a data service such as push e-mail, instant messaging service, browsing, streaming, SIP/VoIP services to name various specific examples. In some embodiments, the RAT endpoints 12,14, in addition to simply being specific points of entry/exit, provide RAT-specific processing. In such embodiments data going to/coming from endpoint 12 is processed in a manner suited particularly to RAT_A, while data going to/coming from endpoint 14 is processed in a manner suited particularly to RAT_B. Examples of such RAT-specific processing are provided below.

Also shown is a first access network 18 that provides access using $RAT_{13}$ A as the radio access technology, and a second access network 20 that provides access using RAT_B as the radio access technology. The radio access technologies may be any radio access technologies for which differentiated processing by the application server 10 is to be provided. Specific examples of radio access technologies include WI-FI™, BLUETOOTH™, and cellular radio access technologies such as UMTS (Universal Mobile Telecommunications System), GPRS (General Packet Radio Service), EVDO (Evolution-Data Optimized) 1xRTT, WiMAX, LTE (long term evolution). Note that the coverage areas of the various radio access technologies are not necessarily distinct. That is to say, some networks may have overlapping coverage areas, while others may have distinct non-overlapping coverage areas. The examples described herein all assume that two different radio access technologies are implemented on the mobile device and available through respective access networks. More generally, embodiments are applicable to any set of radio access technologies that might be provided on a multi-mode mobile device.

Network 16 simply represents any and all network(s) that might be situated between the access networks 18,20 and the application server 10. This might for example include a gateway, a proxy, a VPN concentrator, a web server, a streaming server to name a few specific examples.

A mobile device 30 is shown in FIG. 1A that is obtaining access through the first access network 18 using RAT_A. The same mobile device 30 is shown in FIG. 1B obtaining access through the second access network 20 using RAT_B. The mobile device 30 is a multi-mode mobile device in the sense that it is capable of operating using multiple different radio access technologies. In some implementations, the mobile device has a respective protocol stack for each of the radio access technologies implemented on the device.

The mobile device 30 is configured with mobile device RAT-specific routing information 32. Note that "RAT-specific routing information" is used herein to refer to both the RAT-specific routing information for multiple RATs collectively, and for the routing information for one RAT. Context makes it clear which is being referred to in a given instance. Specifically, the RAT-specific routing information 32 include first RAT-specific routing information 38 in respect of obtaining service from application server 10 when using radio access technology RAT_A. This first RAT_specific host routing table 38 contains routing information that may for example include address and/or port information for RAT_A endpoint 12 of the application server 10. Similarly, the RAT-specific routing information 32 include second RAT-specific routing information 40 in respect of obtaining service from application server 10 when using radio access technology RAT_A. This second RAT_specific routing information 40 contains routing information that may for example include address and/or port information for RAT_B endpoint 14 of the application server 10. In some embodiments, the RAT-specific routing information are stored in a mobile device RAT-specific routing information repository in non-volatile memory within the mobile device 30 such that they survive power down of the mobile device. In some embodiments, the RAT-specific routing information include multiple routing options for one or more radio access technologies.

In some embodiments, the mobile device 30, in addition to being configured with RAT-specific routing information, is configured to perform RAT-specific processing. This involves processing data while using $R_{\_A}$ in a manner suited particularly to $R_{\_A}$, and processing data while using $R_{\_B}$ in a manner suited particularly to $R_{\_B}$. Examples of such RAT-specific processing are provided below.

Also shown is a routing information configuration server 11 responsible for configuring mobile devices such as mobile device 30 with the RAT-specific routing information 32. The routing information configuration server 11 in some embodiments also configures mobile devices to perform RAT-specific processing. The routing information configuration server 11 is shown as a separate entity from application server 10. In some embodiments, the functions of the configuration server and the application server can be integrated into a common device or devices. In some embodiments, the functionality of routing information configuration server 11 is implemented as part of a registration server (not shown) responsible for coordinating registration of mobile devices. In some embodiments, such a registration server (i.e. implemented in combination with the configuration server 11) negotiates with application server 10 which RATs it supports for particular terminals. For example an application server that is a streaming server could force mobile devices to use the faster WI-FI™ and 3G rats and exclude the 2G rat to provide its services.

In operation, the mobile device 30 is configured with the RAT-specific routing information 32 by the routing information configuration server 11. Then, while the mobile device 30 is using RAT_A, for example as provided through the first access network 18, the mobile device uses the first RAT_specific routing information 38 and communicates with application server 10 using RAT_A endpoint 12, as depicted by logical connection 34 shown in FIG. 1A. Similarly, while the mobile device 30 is using RAT_B, for example as provided through the second access network 20, the mobile device uses the second RAT_specific routing information 40 and communicates with application server 10 using RAT_B endpoint 14, as depicted by logical connection 36 shown in FIG. 1B.

The following is an example of the format that the RAT-specific routing information might take. It is to be understood that this is very implementation specific:

<name>
<RAT indication>
<APN>—this is specific to 3GPP RATs
<fully qualified domain name> or IP address
<port(s)> where:

<name> is a field for the name of the particular RAT-specific routing information;

<RAT indication> is a field containing a RAT indication. Different RATs will have different RAT indications. In some embodiments and/or for particular routing information, this is network specific, and contains network identity information such as mobile network code (MNC), network country code (MCC) together with a RAT indication.

<network identifier> is a field containing one or more network identifier parameters such as MNC (mobile network code) or MCC (mobile country code);

<fully qualified domain name> is a field containing a fully qualified domain. In a specific example, this field is used for WI-FI™ routing information; however, more generally, it may be used for other RATs such as cellular RATs as well;

<APN> is a field containing an access point name. Typically, this field would be used for RATs that employ APNs, such as 3GPP (ie. GPRS/UMTS networks);

<address> is a field containing an address, such as an IP address. There may be multiple <address> fields to allow the specification of alternates.

<port> is a field that may include send and receive ports for example. There may be multiple <address or fully qualified domain name:port(s)> fields to allow the specification of alternates. Ports can be used to specify applications in a TCP/IP stack.

WI-FI™ Cellular

In some embodiments, the mobile device 30 is configured with RAT-specific routing information 38 for WI-FI™ access, and for cellular access.

The following is a specific example of RAT-specific routing information for WI-FI™:

| Name | WI-FI ™ |
|---|---|
| RAT Indication | 0x60 |
| Fully qualified domain name and port | abc.ef.ghij.com:1234 |
| Address/Ports | 123.456.78.90:1234 (alternate address) |
| Address/Ports | 321.543.87.09:443 (alternate address) |

In the above example, 0x60 is a RAT indication associated with WI-FI™. For this particular example, the routing information includes a fully qualified domain name plus port and includes a first alternate IP address and port combination and a second alternate IP address and port combination. There is no network identifier in the above example. It is assumed that the same WI-FI™ RAT-specific host routing table would be used for all WI-FI™ networks in this case.

The following is a specific example of a RAT-specific routing information for cellular:

| Name | 2G |
|---|---|
| RAT Indication | 0x30 |
| Network Identifier | 0x123456 |
| APN | apnname.net |
| Address/Ports | 111.222.33.44:1234:1235 (send and receive port in this implementation) |

In some embodiments, the RAT indication and network identifier are combined into a single field. For the specific example above, a combined RAT indication and network identifier might for example take the form 0x12345630, this including the network identity information "123456" and also includes the RAT indication "30" which in this case is assumed to be associated with cellular RAT.

Routing Information Configuration Server

Figure 2:
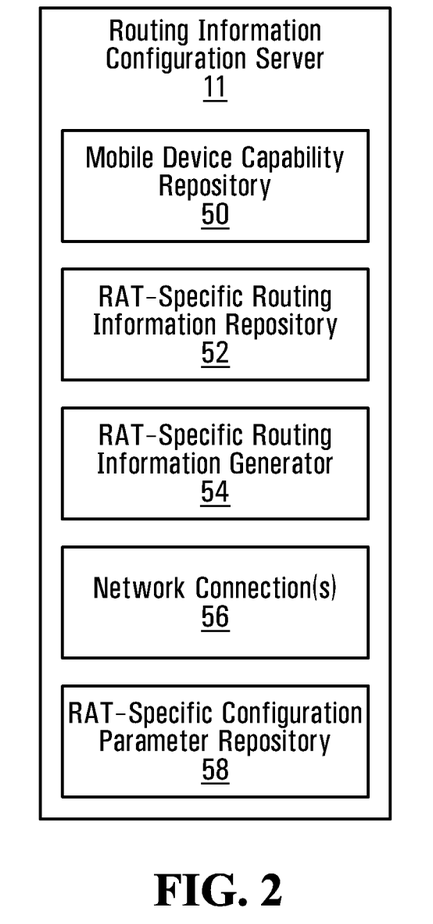
FIG. 2 is a block diagram of a routing information configuration server.

Referring now to FIG. 2, shown is a block diagram of an example implementation of the routing information configuration server 11 of FIG. 1. The routing information configuration server has a mobile device capability repository 50, a RAT-specific routing information repository 52 which contains RAT-specific routing information for each of a plurality of RATs, and a RAT-specific routing information generator 54. Also shown are network connections 56. Some embodiments include a RAT-specific configuration parameter repository 58.

The mobile device capability repository 50 contains information allowing an identification of the RATs supported by each mobile device. In some embodiments, each mobile device has a device type that uniquely determines its RAT capabilities in which case the mobile device capability repository 50 may simply contain a mapping from each device type to an associated set of one or more RATs. In another example, the mobile device capability repository 50 may contain an entry for each device identifier that indicates the RAT(s) supported by the device.

The RAT-specific routing information repository is a RAT-specific routing information repository 52 which contains RAT-specific routing information for each of a plurality of RATs.

The RAT-specific routing information generator 54 uses the RAT capabilities of a mobile device as determined from the mobile device capability repository 50 to look up the associated RAT-specific routing information in RAT-specific routing information repository 52, and outputs a communication containing the RAT-specific routing information(s) for the mobile device.

The mobile device capability repository can be implemented in any memory device suitably structured to contain a mapping from mobile devices to associated capabilities. In some embodiments, mobile device capability repository 50 is implemented using a non-volatile memory. Similarly, the RAT-specific routing information repository 52 may also be implemented using any memory device capable of storing the relevant information. Mobile device capability repository 50 and RAT-specific routing information repository 52 may be implemented using a single memory component. The RAT-specific routing information generator 54 is implemented using one or a combination of hardware, software, and firmware.

The network connection(s) 56 allow for the receipt of requests for RAT-specific routing information for a mobile device, and for the output of the RAT-specific routing information produced by the RAT-specific routing information generator 54. A "request" for RAT-specific routing information, for the purpose of this description, is any communication received by the routing information communication server 11 that triggers the generation and output of the RAT-specific routing information for a mobile device.

In some embodiments, the routing information configuration server 11 also includes the previously introduced RAT-specific configuration parameter repository 58. This contains one or more configuration parameters that can be provided to a mobile device configure the mobile device in a RAT-specific manner. As a specific example, mobile devices may be configured to perform RAT-specific flow control. These parameters can be stored on a per-RAT basis generally, or on a per-RAT and device type basis, or on a per-RAT and device ID basis for example.

In some embodiments, configuration information is stored on the mobile devices and the application server without the involvement of a routing information configuration server 11.

Figure 3:
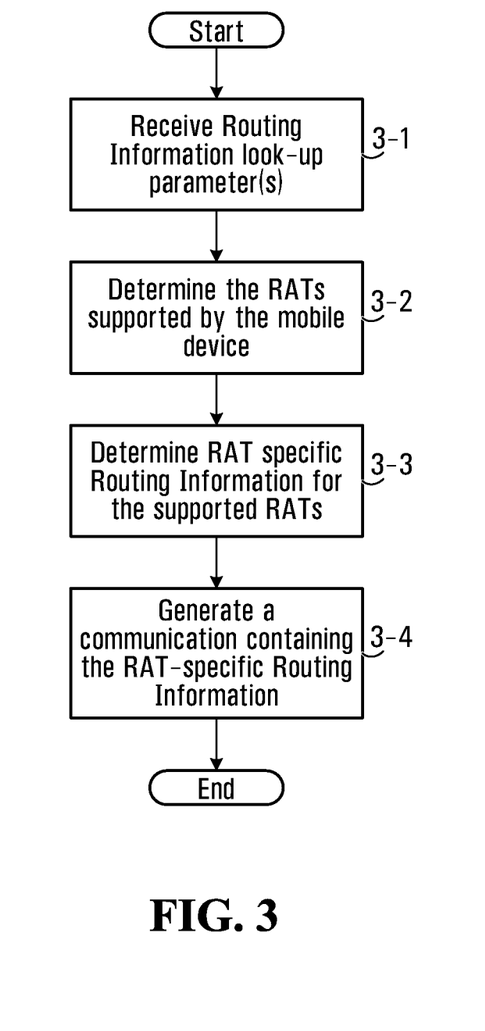
FIG. 3 is a flowchart of a method performed by a routing information configuration server.

Referring now to FIG. 3, shown is a flowchart of an example method of performing routing information configuration. This method may for example be implemented by the configuration server of FIG. 2 for example, but the method is not tied to that particular implementation. In block 3-1, a request for routing information is received which contains routing information look-up parameter(s) for a mobile device. The parameter(s) can be anything to be used to determine the RATs supported on a mobile device. Specific examples include a device ID and a device type. This may for example be received in a registration request. In block 3-2, the routing information look-up parameter(s) are used to determine the RATs supported by the mobile device. In block 3-3, the supported RAT information is used to determine the appropriate RAT-specific routing information for the mobile device. A communication containing the RAT-specific routing information is generated and sent to the mobile device for storage on the mobile device at block 3-4. This may for example be a registration response or registration accept.

Figure 4:
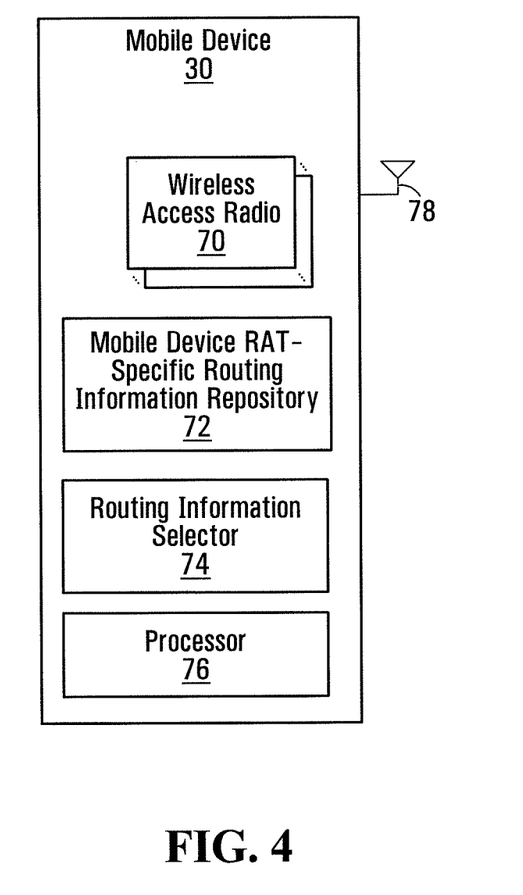
FIG. 4 is a block diagram of a multi-mode mobile device that employs radio access technology-specific host routing.

Referring now to FIG. 4, shown is a block diagram of a mobile device configured to use RAT-specific routing information. The mobile device has a respective wireless access radio 70 for each of at least two RATs supported by the mobile device. The mobile device has a mobile device RAT-specific routing information repository 72 that contains respective RAT-specific routing information for each of the at least two RATs. There is also a routing information selector 74 configured to select the RAT-specific routing information for a given radio access technology. The mobile device has a processing capability indicated generally by processor 76. More generally there can be one or more processors on the device. Also shown is an antenna 78. More generally, there may be one or more antennas. In operation, the mobile device is configured to operate using the RAT-specific routing information selected by the routing information selector 74 for a given radio access technology. In some embodiments, the mobile device RAT-specific routing information repository 72 is implemented in non-volatile memory so as to survive power down of the device. The routing information selector 74 may be implemented in software running on the processor 76, for example.

Figure 5:
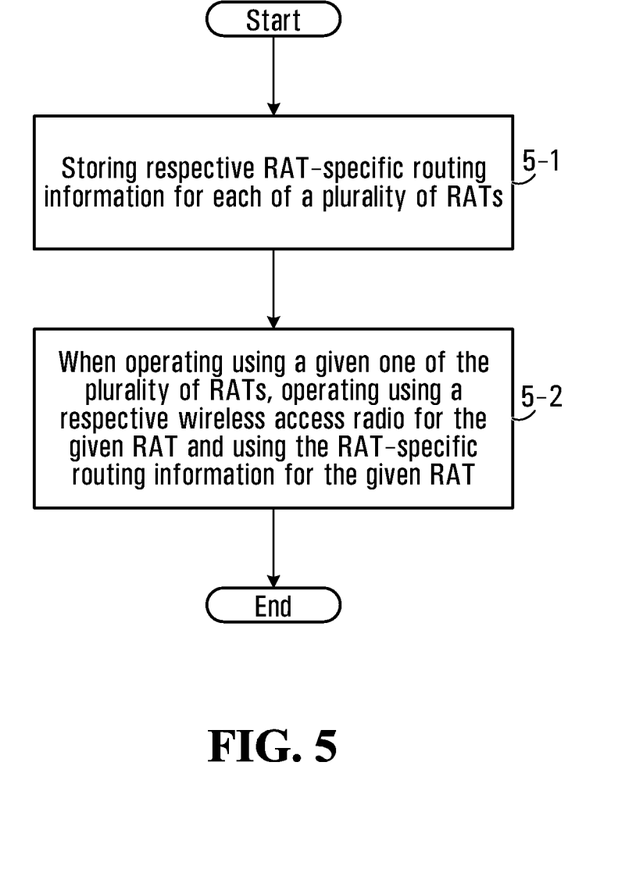
FIG. 5 is a flowchart of a method for execution by a mobile device to perform radio access technology-specific host routing.

Referring now to FIG. 5, shown is a flowchart of an example method of operation of a multi-mode device. The method begins at block 5-1 with storing respective RAT-specific routing information for each of a plurality of different RATs. The method continues in block 5-2 with, when operating using a given one of the plurality of RATs, operating using a respective wireless access radio for the given RAT and using the RAT-specific routing information for the given RAT.

The mobile device storing the RAT-specific routing information may, for example, involve populating the mobile device RAT-specific routing information repository with RAT-specific routing information received over the air. This may, for example, occur as part of a registration procedure. This may, for example, be populated at configuration time during factory assembly. In yet another option, a user of the mobile device may perform the configuration manually.

In some embodiments, in the event of failure to communicate using the routing information thus identified, alternate addresses may be attempted, or a different routing information altogether may be attempted.

In some embodiments, the mobile device determines which RAT-specific routing information to use whenever the mobile device performs a registration. In some embodiments, whenever the mobile device changes RATs, the mobile device determines which RAT-specific routing information to use.

In some embodiments, operating using the RAT-specific routing information for the active RAT comprises obtaining a service from an application server. In this case, the RAT-specific routing information in the routing information repository are RAT-specific routing information in respect of obtaining the service from the application server.

In some embodiments, the service is a push e-mail service.

In some embodiments, for at least one of the RATs, when the mobile device uses that RAT, it does so at least one RAT-specific configuration parameter. This might, for example, be received over the air. In some embodiments, the RAT-specific configuration parameter(s) are received together with the RAT-specific routing information.

In some embodiments, the mobile device operates such that only a single one of the RATs is active at a given time, and that the RAT-specific routing information for that RAT is employed. In some embodiments, a mobile device is configured with application specific and RAT-specific routing information. For example, for two (or more) applications providing service to a mobile device, the mobile device can be configured to use different RAT-specific routing information for the two (or more) applications, and for each of the RATs supported by the mobile device.

In some embodiments, the mobile device is capable of operating using multiple RATs simultaneously in the sense that a first service is being obtained from a first RAT while a second service is being obtained from a second RAT. In such embodiments, the mobile device uses the respective RAT-specific routing information for each of the two RATs being used.

The embodiments described have assumed that the RAT-specific routing information is in respect of obtaining a service from an application server. More generally, the mobile device can be configured to employ RAT-specific routing information for any subset or all of the mobile device's operations. More generally, the RAT-specific routing information need not be specific to/associated with a particular application server.

Application Server

When a mobile device switches from using one RAT to another, the data for the mobile device will start arriving at the application server at the RAT endpoint for the new RAT. This is used by the application server to become aware of the change in RAT. The application server then generates outgoing communications using the appropriate RAT endpoint. In some embodiments, the mobile device generates a "ping" or other communication to the application server upon changing RAT to ensure that the application server is kept up to date on the RAT being used by the mobile device.

Figure 6:
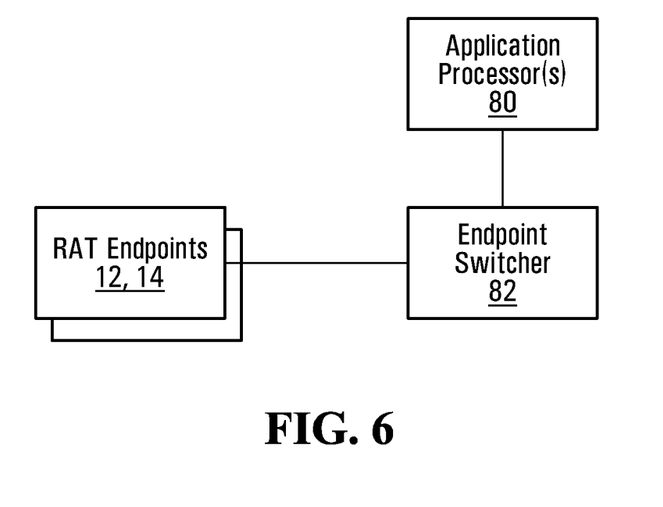
FIG. 6 is a block diagram of an application server.

FIG. 6 contains a block diagram of an example implementation of the application server 10. Shown is a set of one or more application processors 80 for implementing the service provided by the application server, for example a push e-mail service. Also shown is a plurality of RAT-specific endpoints 12,14 described previously. The application server is configured to use the application processor(s) 80 and one of the plurality of RAT-specific endpoints 12,14 to provide the service to a mobile device by sending to and receiving data from the mobile device through one of the RAT-specific endpoints. Also shown is an endpoint switcher 82 that automatically switches between the RAT endpoint being used to provide the service to the mobile device. Upon receiving data from the mobile device through another of the RAT-specific endpoints than is currently being used, the application server automatically switches to using the new RAT-specific endpoint. In some embodiments, the endpoints may be logical in nature, such that one physical endpoint may support multiple RATs. This may be appropriate, for example, in the case where two RATs use the same optimizations or where they do not have any optimizations at all. The endpoints still have different routing information from the perspective of the mobile devices.

In some embodiments, in addition to being RAT-specific, the RAT-specific routing information are network specific. For example, a RAT-specific routing information may be provisioned for a particular home network for a mobile device. In the event the mobile device roams to a different coverage area for which no RAT-specific routing information has been specifically provisioned, in some embodiments, the mobile device attempts to use a network-specific RAT-specific routing information that has been configured for the mobile device for another network that has the same RAT as that of the roaming network. For example, the mobile device may have a network-specific, RAT-specific routing information for a home GSM network. When the mobile device roams to another GSM network, the mobile device attempts to employ the network-specific, RAT-specific routing information for the home GSM network. In another embodiment, the mobile device obtains a further routing information when it connects to a network for which it has not been configured with a RAT-specific routing information.

As detailed above, the network (for example the application server, the RAT endpoints) and the mobile device perform RAT-specific processing. In an example of how the mobile device, and the RAT endpoints might perform RAT-specific processing for different RATs, for cellular, a UDP (user datagram protocol) might be implemented for push e-mail service, whereas for WI-FI™, an SSL (secure socket layer) over TCP (transport control protocol) approach might be implemented. In another specific example, RAT-specific flow control parameters are used. For example, the MTU (message transmit unit) size can be configured on a per-RAT basis. For example, the maximum MTU size for 2G networks might be configured to be 300 bytes, while the maximum MTU size for 3G networks might be configured to be 1 KB. Other examples of flow control parameters that might be changed based on RAT include packets in flight min max for adaptive window size, lost packet timer, retry timer. Any of this behaviour may for example, be configured through the use of RAT-specific configuration parameters as described previously.

Another Mobile Device

Figure 7:
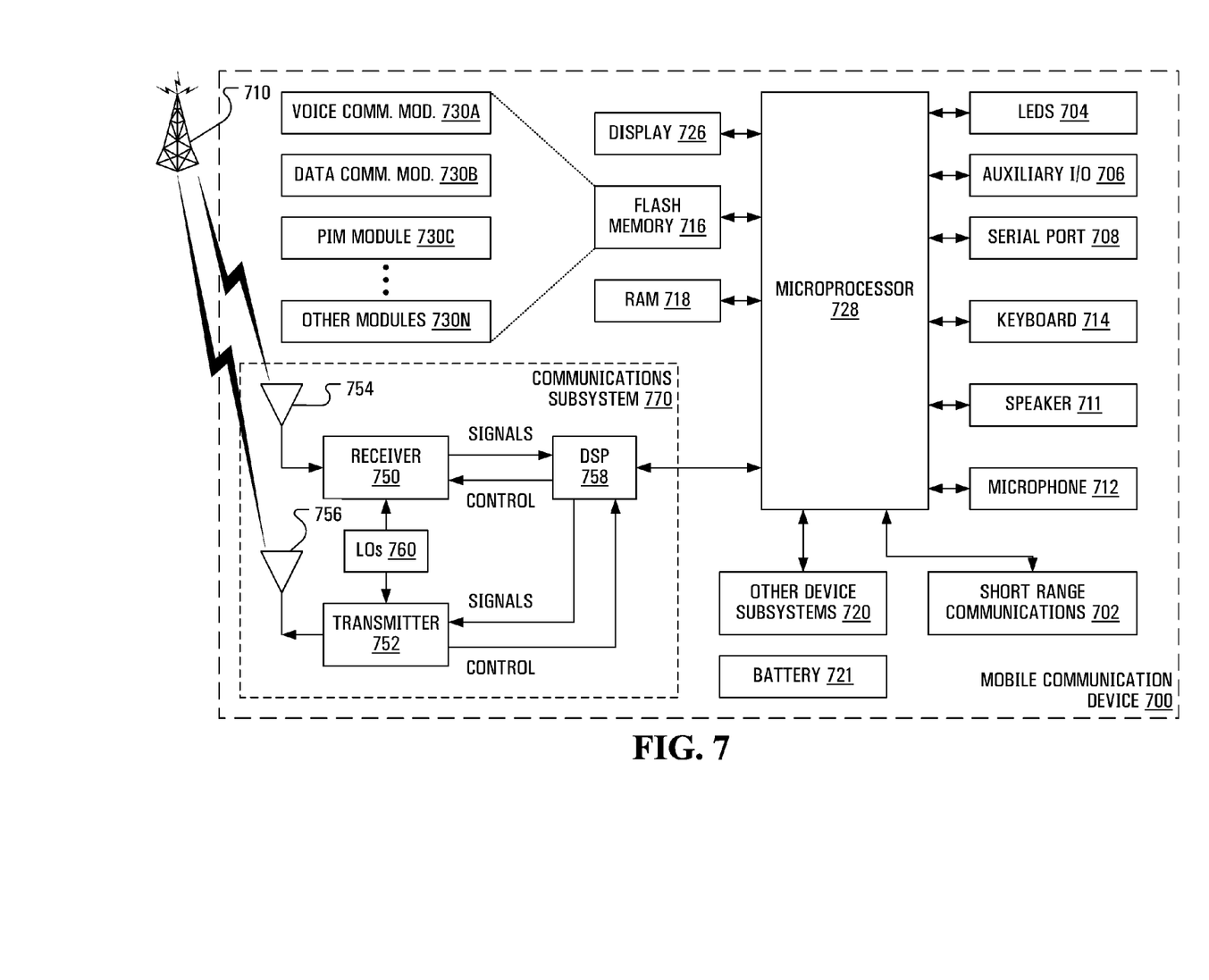
FIG. 7 is a block diagram of another mobile device.

Referring now to FIG. 7, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In some embodiments, the RAT-specific routing information are stored in the flash memory 716. In some embodiments, the RAT-specific flow control parameters are also stored in the flash memory 716. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

The routing information selection function described previously is an example of functionality that is included in a software module stored in memory. Information identifying the mobile device can be stored in the Flash Memory 716 or RAM 718. The information identifying the mobile device is transmitted to the routing information configuration server, via the wireless network 710 using transmitter 752 and antenna 756. Configuration information received from the routing information configuration server for configuring the RAT-specific routing information on the mobile device is received via the wireless network 710 over the air by antenna 754 and receiver 750. It may alternatively be preloaded at factory time or configured manually by the user or IT administrator. The configuration information may be stored in the Flash Memory 716 or RAM 718.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here are multi-mode mobile devices, and as such they include hardware and/or software for implementing at least two RATs. More specifically, in a particular example, there would be a respective communication subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a BLUETOOTH™ communication module to provide for communication with similarly-enabled systems and devices.

Numerous modifications and variations of the present invention are possible in light of the above teachings. It is therefore to be understood that within the scope of the appended claims, the invention may be practiced otherwise than as specifically described herein.

We claim:

1. A mobile device comprising:
a respective wireless access radio for each of a plurality of RATs (radio access technologies);
a mobile device RAT-specific routing information repository, containing respective RAT-specific routing information for each of the plurality of RATs, wherein each RAT-specific routing information in the mobile device RAT-specific routing information repository comprises RAT-specific routing information in order to obtain a service from an application server;
a routing information selector configured to select the RAT-specific routing information for a given RAT of the plurality of RATs;
the mobile device configured to operate using the selected RAT-specific routing information to obtain the service from the application server,
wherein each RAT-specific routing information comprises endpoint information for the application server providing the service;
wherein the endpoint information for the application server providing the service comprises an address of the application server and a port of the application server;
wherein the RAT-specific routing information repository contains a first RAT-specific routing information and a second RAT-specific routing information for two different RATs, the first RAT-specific routing information and the second RAT-specific routing information both comprising endpoint information to obtain the given service from the given application server; and
wherein the endpoint information in the first RAT-specific routing information and the second RAT-specific routing information differ.

2. The mobile device of claim 1 wherein the given service is a push e-mail service.

3. The mobile device of claim 1 wherein:
the mobile device RAT-specific routing information repository contains respective RAT-specific routing information for each of at least two different RATs, for each of at least two services being provided to the mobile device;
the routing information selector is configured to select a respective RAT-specific routing information for the given radio access technology for each of the at least two services; and
for each of the at least two services, the mobile device is configured to operate using the respective selected RAT-specific routing information by communicating with a respective application server providing the service using the selected RAT-specific routing information.

4. The mobile device of claim 1 wherein:
the at least two wireless access radios comprise at least one cellular wireless access capable radio and at least one WI-FI™ wireless access capable radio.

5. The mobile device of claim 1 further configured to populate the mobile device RAT-specific routing information repository with RAT-specific routing information received over the air.

6. The mobile device of claim 1 further configured to populate the mobile device RAT-specific routing information repository with RAT-specific routing information received via user configuration.

7. The mobile device of claim 1 wherein the mobile device RAT-specific routing information repository is populated with RAT-specific routing information during factory configuration.

8. The mobile device of claim 1 further configured to, for at least one of the plurality of RATs, when the mobile device is operating using that RAT, use a respective at least one RAT-specific configuration parameter.

9. The mobile device of claim 8 further configured to receive the at least one RAT-specific configuration parameter for the at least one RAT over the air and to receive the RAT-specific routing information over the air.

10. A method in a multi-mode mobile device, the method comprising:
storing respective RAT-specific routing information for each of a plurality of RATs;
when operating using a given one of the plurality of RATs, operating using a respective wireless access radio for the given RAT and using the RAT-specific routing information for the given RAT,
wherein each RAT-specific routing information comprises:
endpoint information for an application server providing the service;
wherein the endpoint information for the application server providing the service comprises an address of the application server and a port of the application server;
wherein operating using the RAT-specific routing information comprises operating using the RAT-specific routing information for a RAT to obtain the service from the application server;
wherein the stored RAT-specific routing information contains a first RAT-specific routing information and a second RAT-specific routing information for two different RATs, the first RAT-specific routing information and the second RAT-specific routing information both comprising endpoint information to obtain the given service from the given application server; and
wherein the endpoint information in the first RAT-specific routing information and the second RAT-specific routing information differ.

11. The method of claim 10 wherein the given service is a push e-mail service.

12. The method of claim 10 wherein:
storing a respective RAT-specific routing information for each of the plurality of RATs comprises storing respective RAT-specific routing information for each of the plurality of RATs, for each of at least two services being provided to the mobile device;
wherein for each of the plurality of RATs, operating using a respective wireless access radio when using that RAT and using the RAT-specific routing information comprises:
for each service, operating using the respective selected RAT-specific routing information by communicating with a respective application server providing the service using the selected RAT-specific routing information.

13. The method of claim 10 wherein:
operating using an active one of a plurality of wireless access radios each providing a respective RAT (radio access technologies) comprises operating using an active one of a plurality of wireless access radios comprising at least one cellular wireless access radio and at least one WI-FI™ wireless access radio.

14. The method of claim 10 further comprising:
populating a mobile device RAT-specific routing information repository with RAT-specific routing information received over the air.

15. The method of claim 10 further comprising:
for at least one of the plurality of RATs, when the mobile device is operating using that RAT, using at least one RAT-specific configuration parameter.

16. The method of claim 15 further comprising:
receiving the at least one RAT-specific configuration parameter for at least one RAT over the air and receiving the RAT-specific routing information for at least one RAT over the air.

17. A routing information server comprising:
a mobile device capability repository from which can be determined which of a plurality of RATs (Radio Access Technologies) are supported by each of a plurality of mobile devices;
RAT-specific routing information repository containing a respective routing information for each of a plurality of RATs, wherein each RAT-specific routing information comprises RAT-specific routing information in order to obtain a service from an application server,
wherein each RAT-specific routing information comprises endpoint information for the application server providing the service, and the endpoint information for the application server providing the service comprises an address of the application server and a port of the application server;
a RAT-specific routing information generator that determines which of a plurality of RATs are supported by a given mobile device from the mobile device capability repository, obtains the respective routing information from the RAT-specific routing information repository for each RAT supported by the device, and outputs a communication containing the RAT-specific routing information for the mobile device; and
at least one network connection for receiving a request for RAT-specific routing information from a mobile device, and for outputting the RAT-specific routing information to the mobile device,
wherein the RAT-specific routing information repository contains a first RAT-specific routing information and a second RAT-specific routing information for two different RATs, the first RAT-specific routing information and the second RAT-specific routing information both comprising endpoint information to obtain the given service from the given application server; and
wherein the endpoint information in the first RAT-specific routing information and the second RAT-specific routing information differ.

18. An application server comprising:
at least one application processor for implementing services;
a plurality of RAT-specific endpoints each associated with respective RAT-specific routing information, each RAT-specific routing information comprising RAT-specific routing information in order to obtain services from the application server, wherein each RAT-specific routing information comprises endpoint information for the application server providing the service,
wherein the endpoint information for the application server providing the service comprises:
an address of the application server and a port of the application server;
the application server configured to use the at least one application processor and one of the plurality of RAT-specific endpoints to provide a service to a mobile device by sending data to and receiving data from the mobile device through the one of the plurality of RAT-specific endpoints; and an endpoint switcher configured to automatically switch to using another one of the plurality of RAT-specific endpoints to provide the service to the mobile device upon receiving data from the mobile device through the other of the plurality of RAT-specific endpoints, wherein the plurality of RAT-specific endpoints comprises a first RAT-specific endpoint and a second RAT-specific endpoint for two different RATs, the first RAT-specific endpoint associated with a first RAT-specific routing information and the second RAT-specific endpoint associated with a second RAT-specific routing information, and the first RAT-specific routing information and the second RAT-specific routing information both comprising endpoint information to obtain the given service from the application server, and wherein the endpoint information in the first RAT-specific routing information and the second RAT-specific routing information differ: and the application server further comprising:

a mobile device capability repository from which can be determined which of a plurality of RATs are supported by each of a plurality of mobile devices;

a RAT-specific routing information repository containing respective routing information for each of a plurality of RATs; and a RAT-specific routing information generator that determines which of a plurality of RATs are supported by a given mobile device from the mobile device capability repository, obtains the respective routing information from the RAT-specific routing information repository for each RAT supported by the device, and outputs a communication containing the RAT-specific routing information to the mobile device.

19. The application server of claim 18, wherein the given service is a push e-mail service.

20. The mobile device of claim 1, wherein each RAT-specific routing information comprises at least one of an access point name, a fully qualified domain name, or an IP (internet protocol) address.

21. The method of claim 10, wherein each RAT-specific routing information comprises at least one of an access point name, a fully qualified domain name, or an IP (internet protocol) address.

22. The routing information server of claim 17, wherein each RAT-specific routing information comprises at least one of an access point name, a fully qualified domain name, or an IP (internet protocol) address.

23. The application server of claim 18, wherein each RAT-specific routing information comprises at least one of an access point name, a fully qualified domain name, or an IP (internet protocol) address.

* * * * *